Figure 1A:
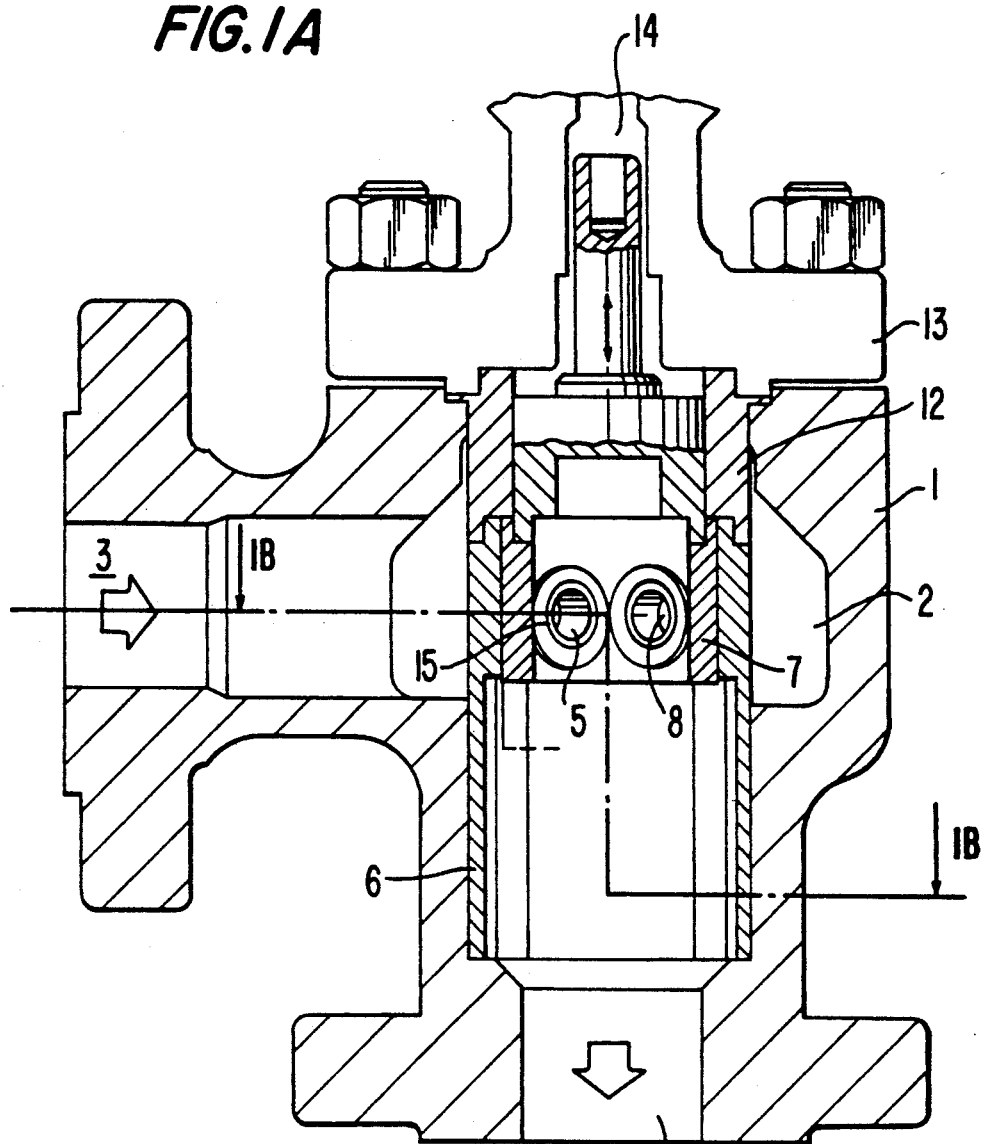

United States Patent [19]

Skyllingstad et al.

[11] Patent Number: 5,246,035
[45] Date of Patent: Sep. 21, 1993

[54] VALVE DEVICE HAVING STATIONARY AND MOVABLE OR TURNABLE VALVE BODIES

[75] Inventors: Olav Skyllingstad, Épouvilles, France; Lars Nøkleberg, Jar; Terje Søntvedt, Gjettum, both of Norway

[73] Assignee: Norsk Hydro a.s., Oslo, Norway

[21] Appl. No.: 903,325

[22] Filed: Jun. 24, 1992

[30] Foreign Application Priority Data

Jun. 24, 1991 [NO] Norway ................................ 912455

[51] Int. Cl.$^5$ .......................... F16K 5/04; F16K 47/04
[52] U.S. Cl. .......................... 137/625.31; 137/625.32; 251/368
[58] Field of Search ............ 137/625.31, 625.32, 137/329.01, 329.06, 625.35; 251/368, 209, 208

[56] References Cited

U.S. PATENT DOCUMENTS

| 3,066,735 | 12/1962 | Zingg ..................... 137/329.01 X |
| 3,480,037 | 11/1969 | Alexander, Jr. ............ 137/329.06 |
| 3,558,100 | 1/1971 | Hulsey ..................... 251/209 X |
| 4,503,878 | 3/1985 | Taylor . | |
| 4,732,364 | 3/1988 | Seger et al. . | |

FOREIGN PATENT DOCUMENTS 145479  4/1921  United Kingdom ........... 137/625.32

Primary Examiner—Arnold Rosenthal
Attorney, Agent, or Firm—Wenderoth, Lind & Ponack

[57] ABSTRACT

The invention provides an erosion resistant pressure reduction valve or choke comprising a valve housing (1,22) defining a valve chamber (2) connected with an inlet (3) and outlet (4), a stationary first valve body (6,17) arranged in the chamber, and a second valve body (7,18). The second valve body is arranged so as to be turnable or displaceable relative to the first valve body by means of a spindle or the like (14,23). The first and second valve bodies are each provided with corresponding flow-through apertures (19,28). Flow through the valve is regulated by turning or displacing the turnable/displaceable second valve body relative to the first. The apertures in the valve bodies (6,7,17,18) are provided with casings (15,20) made in one piece of polycrystalline diamond.

10 Claims, 3 Drawing Sheets

VALVE DEVICE HAVING STATIONARY AND MOVABLE OR TURNABLE VALVE BODIES

The present invention provides a pressure reduction valve or choke which retards erosion. The inventive valve comprises a valve housing defining a valve chamber connected to an inlet and an outlet, a first valve body immovably fixed in the chamber and a second valve body arranged so as to be turnable or displaceable relative to the first valve body. The second valve body is turned or displaced by a spindle or some other means. Each valve body is provided with corresponding holes or flow-through apertures. Flow through the inventive valve is regulated by turning or displacing the second valve body relative to the first.

In connection with the exploitation of oil and gas, pressure reduction valves or chokes are used to control the pressure and the stream of oil and gas from subterranean reservoirs. Usually, these chokes sit in a christmas tree of a particular oil well. They are arranged so as to be demounted for maintenance or replacement.

The chokes often operate under very difficult conditions of high temperature and pressure and with high current velocities. Often, the oil and gas contain sand particles; erosion may frequently be extreme in exposed parts of the chokes. Consequently, these parts or entire chokes have to be replaced after a short time.

Replacement and maintenance of the chokes is risky because of the high pressure under which they operate. Special safety precautions must be taken to reduce the danger of pollution to the surroundings and to avoid injury to persons doing the maintenance and replacement. When oil and gas are exploited at great subsea depths, chokes are arranged on a christmas tree connected to seabed structures. Replacement and maintenance of the chokes in such installations is particularly risky and demanding, and the costs are high. Clearly, extension of the choke lifetime can achieve reduced replacement/maintenance costs. Therefore, efforts have been made to develop regulatable chokes with erosion-resistant properties. U.S. Pat. No. 4,732,364 discloses a choke in the form of a valve seat with a turnable, with an axially displaceable pin extending into a casing arranged in a valve housing. The pin has a conical portion corresponding to a complementary conical portion in the casing. The conical portions of the pin and casing are coated with polycrystalline diamond tiles to increase erosion resistance. By turning the pin, the fluid stream through the valve is regulated. The valve can be completely closed by turning the pin such that a projecting part of the pin rests against seat-shaped part at the upper end of the casing. The valve disclosed in this patent has not found any practical application since the tiles loosen and fall off. The valve is also expensive to make, both because the large number of specially designed tiles are expensive to produce and because painstaking work is required to bond the tiles.

An object of the present invention is to provide a choke or pressure reduction valve with a substantially longer lifetime, i.e. which is substantially more erosion resistant than conventional valves. Another object is to provide a pressure reduction valve substantially cheaper to make and simpler to maintain.

In accordance with the invention, a valve as characterized in the preceding paragraph has been produced. The inventive valve is characterized in that the apertures in the valve body are provided with one piece polycrystalline diamond casing.

Dependent claims 2–6 define advantageous features of the invention.

Figure 1B:
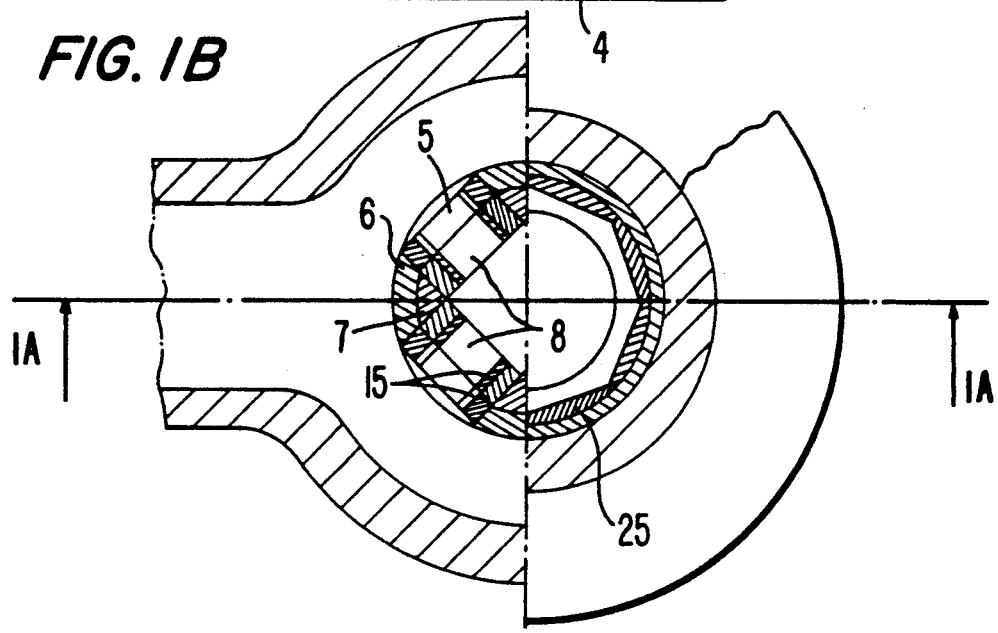
Figure 2A:
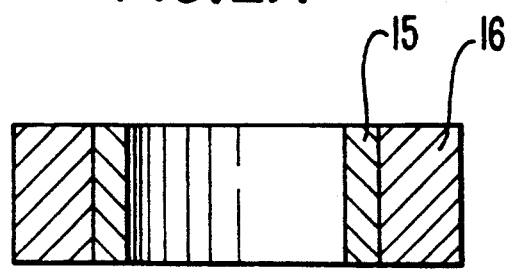
Figure 2B:
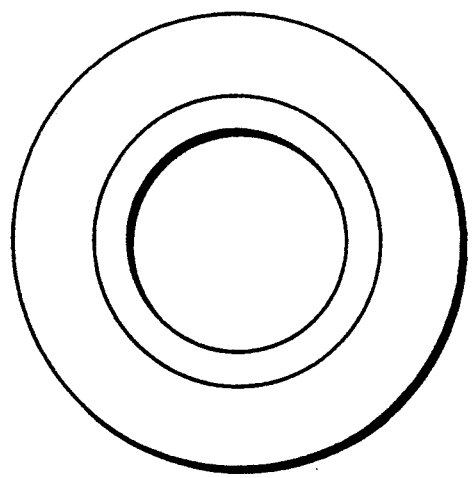
Figure 3A:
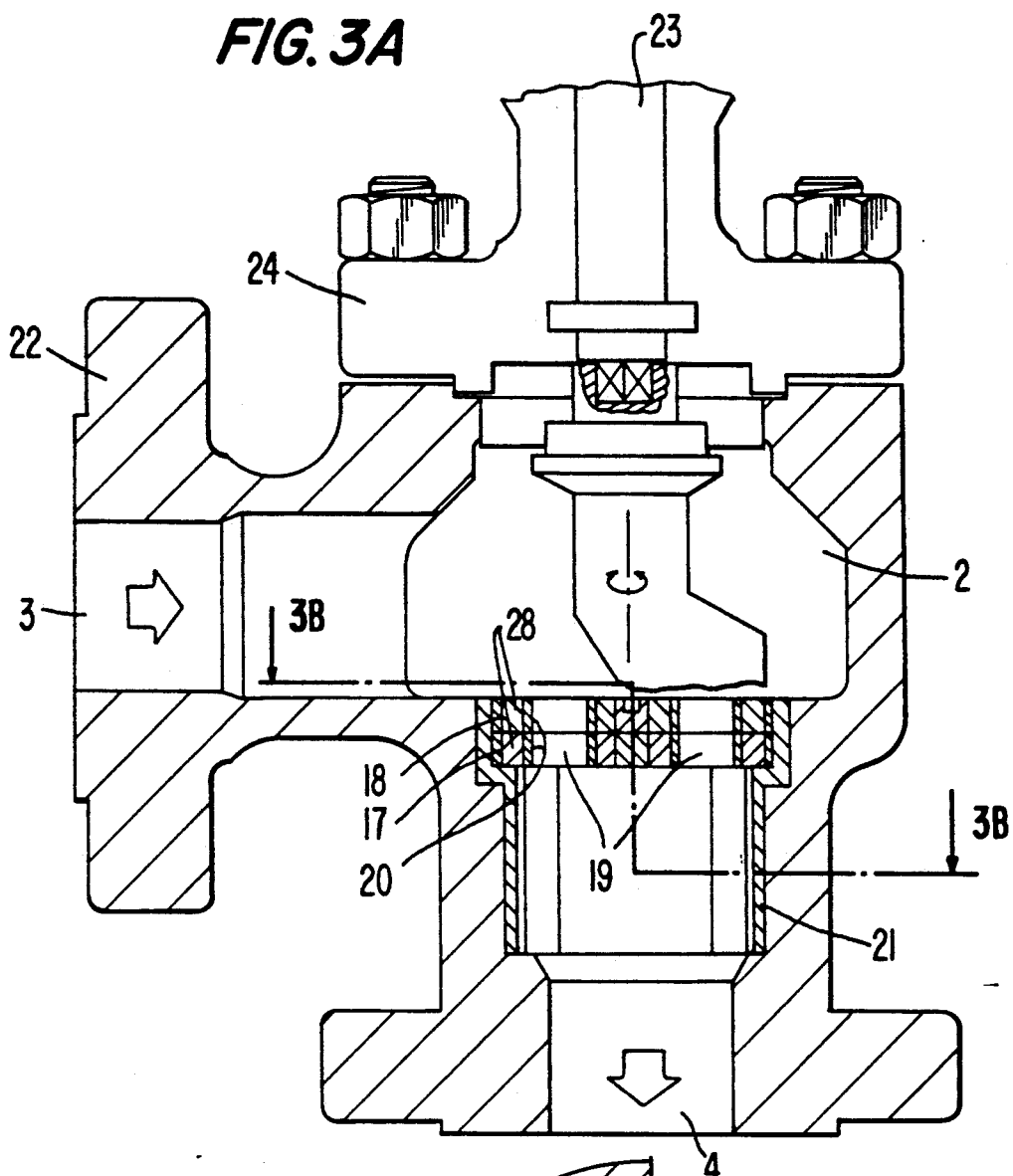
Figure 3B:
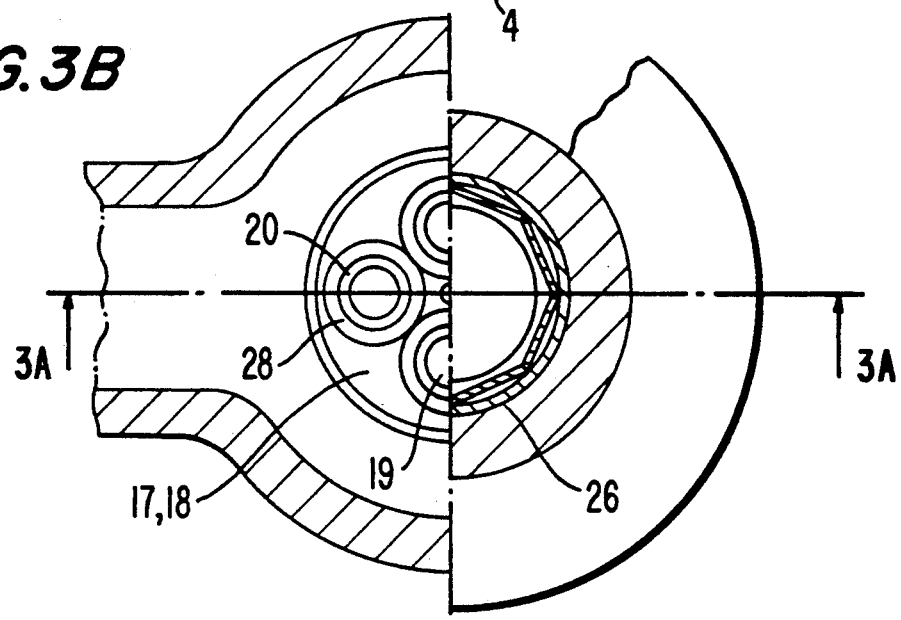

The invention shall now be described with an example and with reference to the attached drawing, in which FIG. 1 shows a vertical and horizontal section (along line A—A) of an embodiment of the inventive choke, FIG. 2 shows in cross section and a overhead view of a casing provided in accordance with the invention, and FIG. 3 shows a vertical and horizontal section (along line B-B) of an alternate embodiment of the inventive valve.

FIG. 1 shows as previously stated vertical and horizontal sections of the inventive valve. The valve comprises a valve housing 1 defining a valve chamber 2 connected with an inlet 3 and a outlet 4. A substantially cylindrical stationary first valve body 6 is arranged in the valve chamber 2. The stationary valve body 6 is provided with radial apertures 5. Valve body 6 is fixed to the valve housing 1 by a bushing 12 pressed downwardly by a closure 13. A second valve body 7 is arranged inside the stationary valve body 6. A valve spindle 14 can axially displace the second valve body. The axially displaceable valve body 7 is adapted to the interior shape of the stationary valve body 6, and is provided with apertures 8 corresponding to apertures 5 in the stationary valve body 6.

The stream of fluid through the inventive valve can be regulated by displacing the second valve body 7 in an axial direction by means of the spindle 14 such that the flow-through area between the apertures is increased or decreased. The inventive valve can be completely shut by displacing the second valve body 7 and thereby the apertures 8 past apertures 5 in the stationary valve body 6.

The essence of the invention is that the apertures 5 and 8 in the bodies 6 and 7 are provided with casings 15 made of onepiece polycrystalline diamond. The casings 15 can be fastened to the valve bodies 6,7 by a shrinking on process, soldering or in another manner.

The casings 15 made of this material can be advantageously anchored as shown in FIG. 2 to exterior casings or rings 16 of wolfram carbide or similarly suitable material.

FIG. 3 shows an alternatively shaped inventive valve based on the same principle but somewhat different from the previously described embodiment. The difference is that instead of valve bodies 6,7 with radial apertures, two discs are used, one being a lower stationary disc 17 and the other an upper rotatable disc 18. Each disc 17,18 is provided with axially corresponding apertures 19 with casings 20 of polycrystalline diamond. The discs are arranged in a valve-stem guide 21 in the valve housing 22. The upper disc 18 can be rotated by means of a valve spindle 23 rotatable arranged in a closure 24. By rotating the upper disc 18 relative to the lower disc 17, flow through quantity can be regulated or alternatively the valve can be closed.

Access to the valve chambers for both inventive valve embodiments shown in FIGS. 1–3 is simply attainable by screwing off (demounting) the closures 13 and 24. Thus, the valve bodies are easily removable and replaceable during maintenance.

To reduce erosion of particularly exposed parts of the valve, it may be desirable to furnish these parts with erosion-resistant material. In FIGS. 1 and 3, examples are illustrated with the valve body 6 and guide 21 are provided with wolfram carbide plates 25,26 coated with a diamond layer in accordance with the vapor deposition method.

In the drawings, inventive valves are shown with four apertures.

With respect to the invention as defined in the claims, the inventive valves can be provided with larger, fewer or more apertures, depending upon desired capacity, pressure conditions, etc. Similarly, the number of casings 20 in the direction of the flow can be more than one.

We claim:

1. An erosion resistant reduction valve comprising:
   a valve housing defining a valve chamber and an inlet and an outlet connected thereto;
   a stationary first valve body positioned within said chamber between said inlet and said outlet, said first valve body having therethrough a plurality of flow through apertures;
   a movable second valve body mounted within said chamber for displacement relative to said first valve body, said second valve body having therethrough a plurality of flow through apertures equal to and alignable with said plurality of apertures of said first valve body;
   whereby flow through said chamber from said inlet to said outlet is regulated by displacing said second valve body relative to said first valve body and thereby varying alignment of said apertures of said second valve body with said apertures of said second valve body; and
   said apertures in said first valve body and said apertures in said second valve body being defined by respective casings fitted in respective said valve bodies, each said casing being formed as a unitary one-piece member of polycrystalline diamond.

2. A valve as claimed in claim 1, wherein each said casing is anchored in the respective said valve body by a respective exterior casing.

3. A valve as claimed in claim 2, wherein each said exterior casing is a wolfram carbide.

4. A valve as claimed in claim 2, wherein each said exterior casing is of stainless steel.

5. A valve as claimed in claim 1, wherein said first and second valve bodies comprise substantially concentric respective cylindrical members including a stationary outer member forming said first valve body and an inner member movable axially relative to said outer member and forming said second valve body, and said apertures extend radially.

6. A valve as claimed in claim 1, wherein said first and second valve bodies comprise respective disc-shaped members including a stationary first member and a second member mounted to rotate relative to said first member, and said apertures extend axially.

7. A valve as claimed in claim 1, wherein each said aperture is defined by plural said casings arranged successively in the direction of flow.

8. A valve as claimed in claim 1, wherein said valve bodies are provided with at least one support casing extending in the direction of flow and formed of an erosion resistant material.

9. A valve as claimed in claim 8, wherein said material comprises wolfram carbide.

10. A valve as claimed in claim 8, wherein said material comprises acid resistant steel.

* * * * *